United States Patent [19]

Harrison et al.

[11] Patent Number: 4,937,914
[45] Date of Patent: Jul. 3, 1990

[54] DOOR CONTROL DEVICE

[75] Inventors: Stephen J. Harrison; Peter E. Brown, both of Bridgnorth, United Kingdom

[73] Assignee: Jebron Limited, Wednesbury, United Kingdom

[21] Appl. No.: 330,709

[22] Filed: Mar. 30, 1989

[30] Foreign Application Priority Data

Jul. 15, 1988 [GB] United Kingdom ................ 8816862
Nov. 2, 1988 [GB] United Kingdom ................ 8825642

[51] Int. Cl.5 .............................................. E05F 3/14
[52] U.S. Cl. .......................................... 16/62; 10/58; 10/64; 10/79
[58] Field of Search ............... 16/52, 58, 62, 64, 69, 16/79

[56] References Cited

U.S. PATENT DOCUMENTS

| 409,961 | 8/1889 | Goodenough | 16/69 |
|---|---|---|---|
| 1,309,056 | 7/1919 | Angell | 16/69 |
| 1,359,144 | 11/1920 | Angell . | |
| 1,833,121 | 11/1931 | Norton | 16/51 |
| 3,845,670 | 11/1974 | Grayson | 465/415 |
| 4,502,180 | 3/1985 | Harrison et al. | 16/52 |
| 4,744,125 | 5/1988 | Scheck et al. | 16/62 |

FOREIGN PATENT DOCUMENTS

| 823704 | 5/1936 | France . | |
|---|---|---|---|
| 0580797 | 11/1957 | Italy | 16/62 |
| 2158148 | 11/1985 | United Kingdom | 16/62 |

*Primary Examiner*—Richard K. Seidel
*Assistant Examiner*—James Miner
*Attorney, Agent, or Firm*—Webb, Burden, Ziesenheim & Webb

[57] ABSTRACT

The piston of a door control device is assembled from a channel and cups welded on to opposite ends of the channel. A valve assembly is mounted in one of the cups. Rollers extend between opposite sides of the channel and co-operate with teeth on a rotatable member to which a control arm is secured.

5 Claims, 3 Drawing Sheets

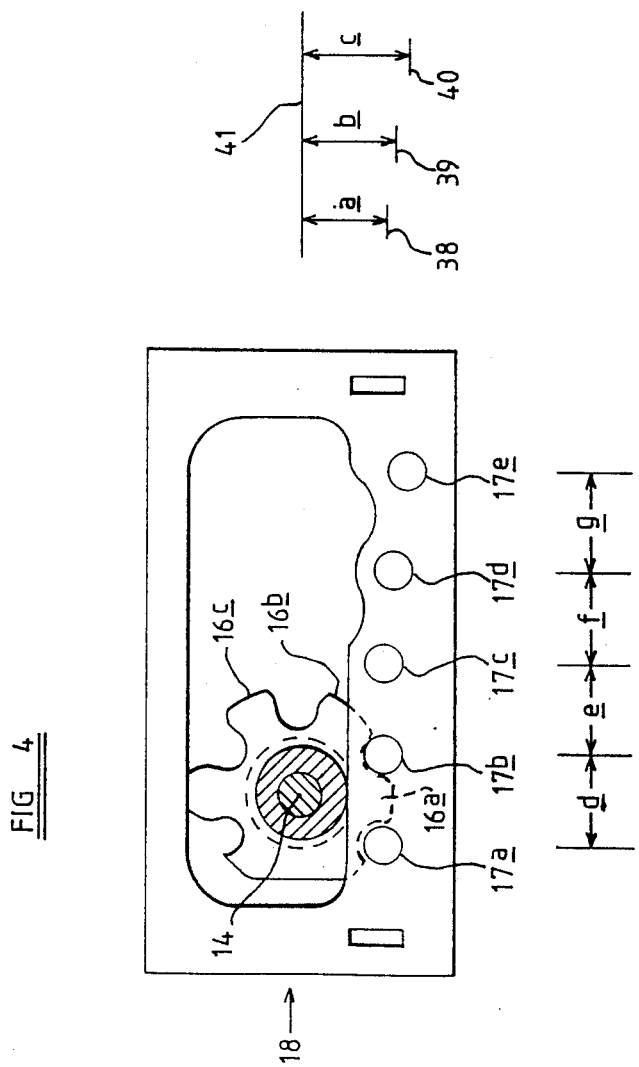

DOOR CONTROL DEVICE

BACKGROUND OF THE INVENTION

The present invention relates to a door control device comprising a housing, a slide which is slidable along a path in the housing and a control member mounted for turning relative to the housing about an axis which is transverse to said path, the slide having a row of drive elements which are spaced apart along the path and the control member having a number of drive elements which are arranged around the axis for co-operation with respective ones of the drive elements of the slide to transmit drive between the control member and the slide. In use, the housing is mounted on one of a door and a fixed structure defining a doorway to be closed by the door. The control member is typically connected by means including a radial arm with the other of the door and the fixed structure so that opening of the door causes turning of the control member relative to the housing and therefore displacement of the slide along its path inside the housing. There is provided inside the housing means which co-operates with the slide to control movement thereof and therefore movement of the door relative to the fixed structure. This means typically includes a spring acting between the slide and the housing and a fluid which is caused to flow through one or more orifices when the slide moves along its path in the housing.

In known door control devices of the kind described, the slide is typically formed from a single piece of metal by machining. This is a relatively expensive procedure. In GB No. 2,110,297, we have disclosed a slide which is fabricated from a tube, a pair of end plugs and a rack. The tube is cut from drawn tubular stock and a part of the tube is cut-away to form windows in the tube, through which the control member can extend. The end plugs are machined and then one end plug is inserted into an end portion of the tube. The rack is formed separately, is inserted into the tube and then the other end plug is inserted so that the rack is trapped inside the tube. The end plugs and rack are brazed to the tube. The tube is required to have an external profile which compliments the internal profile of the housing so that the slide will function as a piston in the housing.

The door control device disclosed in GB No. 2,110,297 comprises a coiled compression spring which acts between the slide and the housing. When a door which is controlled by the device is opened, the spring is compressed. The spring subsequently provides energy to close the door. The magnitude of the force exerted by the spring on the slide depends upon the degree of compression of the spring and falls, as the spring extends. In order to ensure that, just as the door closes and a latch associated with the door must be overcome, the spring exerts sufficient force, it is necessary for the spring to exert an excessively large force when the door is opened wide.

SUMMARY OF THE INVENTION

According to a first aspect of the present invention, a door control device of the kind described is characterised in that at least one of said drive elements of the control member extends from the axis of the control member a distance which differs from the distance which another of the drive elements of the control member extends from the axis of the control member.

A device according to the first aspect of the invention can be so arranged that, as the spring approaches a fully extended condition, the magnitude of the torque resulting from the action of the spring is maintained or is even increased, according to the required operating characteristics of the device.

According to a second aspect of the invention, there is provided a door control device of the kind described wherein the slide further includes a valve assembly and which device is characterised in that the valve assembly is connected with all of the drive elements of the slide by a single carrier.

According to a third aspect of the invention, there is provided a door control device of the kind described characterised in that the slide includes a carrier for the driver elements of the slide and in that the drive elements of the slide are individually mounted in the carrier.

In a device according to the second aspect of the invention, the valve assembly preferably has an external profile, as viewed along said path, which is complementary to the internal profile of the housing, also as viewed along the path. In this case, it is unnecessary for the external profile of the carrier, as viewed along the path, to compliment the internal profile of the housing. The profile of the carrier may be narrow, relative to that of the valve assembly.

In a case where the external profile of the carrier is non-circular, the carrier can be engaged by guide elements provided inside the housing and which restrain turning of the carrier relative to the housing about an axis extending along the path of travel of the slide. This is useful in a case where a coiled compression spring acts on the slide, because such a spring tends to exert a torque on the slide and this torque can be resisted by the guide elements of the housing.

BRIEF DESCRIPTION OF THE DRAWINGS

An example of a door control device embodying each aspect of the present invention will now be described, with reference to the accompanying drawings, wherein:

FIG. 4 shows a plan view of a carrier of the device, together with the drive elements of the slide and of the control member of the device.

Figure 1:
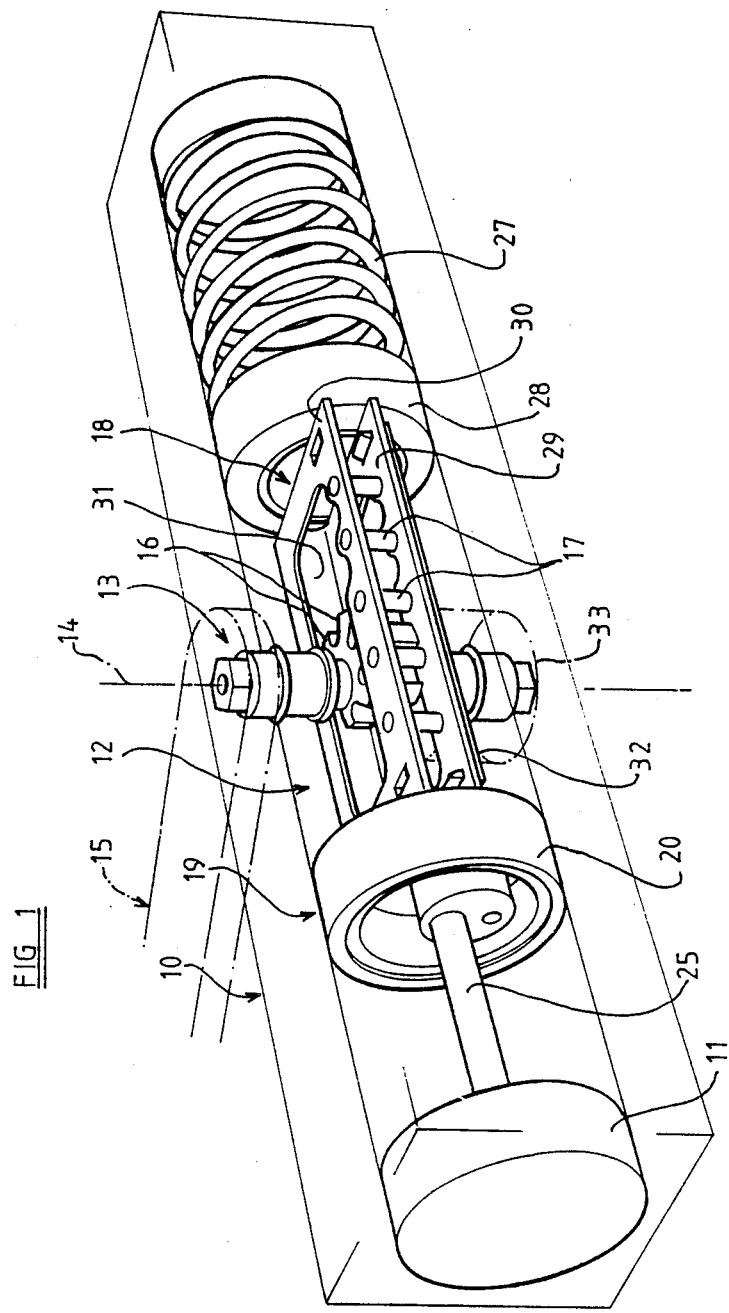
FIG. 1 is a diagrammatic illustration of the assembled device.

The device illustrated in the accompanying drawings comprises an elongated housing 10 which may have a polygonal external profile, as viewed along the housing, for example a square profile. Means (not shown) is provided for mounting the housing on the face of a door, or on a fixed structure defining a doorway to be closed by the door. This means may include screws extending through holes in the housing into the door or other structure. The housing is hollow and may have at each of its ends respective openings which are closed by plugs. One of these plugs is identified in FIG. 1 by the reference numeral 11. The plugs may be screwed into the housing and ring seals may be associated with the plugs to prevent leakage of fluid from the inside of the housing.

The device further comprises a slide 12 which is disposed inside the housing 10 for reciprocation relative thereto along a path which extends along the housing.

The device also includes a control member 13 which is mounted for rotation relative to the housing about an axis 14 which is perpendicular to the length of the housing and to the path of travel of the slide 12. The control member extends across the interior of the housing and opposite portions of the control member lie in respective apertures formed in the wall of the housing. Separately formed bearing elements may be interposed between the control member and the housing in these apertures. Alternatively, the bearing supporting the control member may be constituted by the housing wall itself. Ring seals are interposed between the housing wall and the control member to prevent leakage of fluid from inside the housing. Conveniently, these seals lie in peripheral grooves formed in the control member so that the bearing surfaces of the housing can be entirely cylindrical.

At least one end portion of the control member 13 protrudes to the outside of the housing 10. On this end portion, there is fixed an arm 15 which extends radially from the axis 14. The arm is connected in a known manner with the door or the stationary structure. Typically, the arm is formed with a polygonal opening in which there is received a complementary end portion of the control member and the arm is retained on the control member by a screw (not shown) driven into the end of the control member.

The control member 13 includes an array of drive elements in the form of teeth 16. The teeth 16 are spaced from one another around the axis 14 and lie half-way along the control member. The slide 12 is provided with a row of drive elements 17 for co-operating with respective ones of the teeth 16, the length of the row extending generally along the housing 10. In the example illustrated, the drive elements 17 are formed separately from one another and are individually mounted on a common carrier 18. The carrier is an elongated component disposed inside and arranged with its length extending along the housing.

The slide 12 further comprises a valve assembly 19 which is mounted on the carrier 18 at one end thereof. The carrier 18 connects the valve assembly with each of the drive elements 17 and connects these drive elements with one another.

The valve assembly includes a hollow outer member 20 which has an external profile complementary to the internal profile of the housing 10. The member 20 is thus a sliding fit in the housing. The outer profile of this member and the internal profile of the housing are preferably circular. The member 20 is conveniently formed as a pressing metal and the external surface of the member may be ground to achieve a close sliding fit in the housing. The member 20 is formed with a central opening 21 to permit fluid to pass through the member when the slide 12 moves along the interior of the housing.

Valve means is provided for controlling the flow of fluid through the central opening 21 of the member 20 and thereby controlling movement of the slide along the housing. The valve means includes a valve body 22 on which there is fitted a resilient ring 23. This ring is engageable with a seat provided at the inside of the member 20 to prevent flow of fluid through the central opening 21 and between the valve body 22 and the side wall of the member 20. The valve body is trapped in the member 20 by a retaining ring 24 which is a force fit in the member 20. The retaining ring overlaps with surfaces of the valve body facing along the housing and is so positioned in the member 20 that there is freedom for limited movement of the valve body relative to the member 20 between an open position, in which the ring 23 is spaced from its seat in the member 20 and a closed position in which the ring 23 is in fluid-tight contact with that seat. The valve body is free to move relative to the member 20 under the action of pressure in fluid inside the housing. Accordingly, the valve body functions as a non-return valve and automatically moves to its closed position when the slide is driven in one direction along the housing, for example a direction corresponding to closing of the door controlled by the device. Opening of the door is then not impeded significantly by pressure in fluid inside the housing, because that pressure moves the valve body 22 to the open position and fluid is able to flow relatively freely between the valve body and the member 20.

There is formed in the valve body 22 a central passage, through which fluid can flow when the valve body is in the closed position relative to the member 20. Means, which may be know per se, is provided for controlling the flow of fluid through this passage according to the required operating characteristics of the device. By way of example, there is represented in FIG. 1, a tube 25 which is a sliding fit in the passage of the valve body 22 and which is mounted in a carrier in the end plug 11. Suitable adjustable arrangements for controlling the flow of fluid through the tube 25 are disclosed in GB No. 2,158,148 and GB No. 2,116,251.

Figure 2:
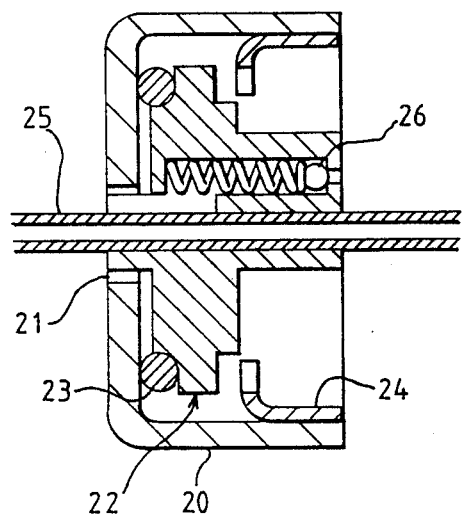
FIG. 2 shows a cross-section through a valve assembly of the device.

As shown in FIG. 2, there may also be formed in the valve body 22 a valve orifice containing a spring-loaded closure element 26 which opens to relieve any excessive pressure which may be established within the housing 10 at one side of the valve assembly. It will be appreciated that other known valve arrangements may be mounted in the member 20.

The device also includes a coiled compression spring 27 for storing energy when the controlled door is opened and for driving the slide 12 along the housing 10 to cause the door to close. The spring is mounted in an end portion of the housing and acts between the slide 12 and a part fixed with respect to the housing, for example an end plug fitted in the housing at the end thereof opposite to the plug 11. One end of the spring seats on the slide 12 and the slide may be provided with a member 28 identical with the member 20 to receive an end portion of the spring. The members 20 and 28 have the form of cups and are conveniently welded onto opposite end faces of the carrier 18. These end faces may be flat and there may be formed on each of the member 20 and 28 a respective rib which faces towards the carrier and provides convenient sites for spot-welding of these members to the carrier. The rib and the spot welds are nearer to the circumference of the member 20 then is the seat with which the valve ring 23 engages.

The carrier 18 comprises two, substantially flat support portions 29 and 30 which are mutually parallel and which are spaced apart by a gap in which the teeth 16 are received. These support portions are united by a bridge portion 31 of the carrier. The carrier is preferably formed as a pressing of metal. It will be noted that the overall width of the carrier, as measured in a direction from the support portion 29 to the support portion 30, is small, as compared with the diameter of the valve assembly 19. The overall dimension of the carrier which extends from the bridge portion to the remote edges of the support portions may be almost as great as the diameter of the valve assembly but there are clearances between the bridge portion and those edges of the carrier, on the one hand, and the internal surfaces of the housing 10 on the other hand. The control member 13 extends through the windows cut in the support portions 29 and 30 of the carrier.

Each of the drive elements 17 of the slide 12 is elongated and has opposite end portions disposed in respective apertures formed in the support portions 29 and 30. The elements 17 are preferably formed as rollers and may be free to turn about their own axes relative to the carrier. Each element 17 is preferably cylindrical throughout its entire length.

Retaining elements are provided for retaining the drive elements 17 in the support portions 29 and 30 of the carrier. Each retaining element is of plate-like form and is mounted on a corresponding one of the support portions to cover the ends of the elements 17. One of the retaining elements is identified in FIG. 1 by the reference numeral 32. The retaining element is attached to the carrier by lugs formed on opposite end portions of the retaining element which snap into respective apertures formed in the support portion 29. The other retaining element is identical with the element 32 and is mounted on the support portion 30 in a corresponding manner but is omitted from FIG. 1 for clarity of illustration of other parts.

Guide elements are provided inside the housing 10 for engaging in sliding contact with the retaining elements on the carrier. The guide element which engages the retaining plate 32 is indicated in FIG. 1 at 33. The guide elements may be annular and may surround respective portions of the control member 13, being mounted in the apertures in the housing 10 through which the control member extends. The guide elements restrain turning of the slide 12 relative to the housing 10 about a longitudinal axis of the housing.

The control member 13 comprises an elongated, rectilinear core 34, on opposite ends of which are mounted respective end pieces 35 and 36 of the control member. There is trapped on the core between these end pieces a central piece 37 which incorporates the teeth 16. All of the teeth 16 are preferably formed integrally with one another. The central piece 37 may be machined from a single piece of metal. Alternatively, the central piece 37 may have a laminated structure, each layer being stamped from sheet metal. The central piece, or each layer thereof is a force-fit on the core 34. Typically, the core is formed with longitudinal ribs or splines and the piece 37 is formed with a circular opening through which the core is forced to deform the boundary of the opening somewhat and establish a keyed relation between the core and the central piece 37.

Each of the end pieces 35 and 36 is machined from a single piece of metal, into which is drilled a cylindrical bore to receive a corresponding part of the core 34. When the end pieces are forced onto the core, the core deforms the bores of the end pieces somewhat to establish a keyed relation between the end pieces and the core. The end pieces 35 and 36 may be identical with each other, each having at one end a threaded bore to receive a screw for securing the arm 15 on the end piece. The several components of the control member 13 are held in assembled relation with one another simply by interference between those components. We have found that it is unnecessary to unite these components by fusion.

In the example illustrated, there are five drive elements 17 mounted in the carrier of the slide. The drive elements are arranged in a row extending generally along the housing 10 but the row is non-rectilinear. As shown in FIG. 4, a part of the row is rectilinear. This part comprises the first three drive elements 17 from the left, as viewed in FIG. 4. When the slide reciprocates in the housing, each of these three drive elements moves along a path represented by the line 38. This path is spaced by the distance a from the axis 14. The remainder of the row of drive elements is curved. The next drive element moves along a path represented by the line 39, which is spaced from the axis 14 by a distance b. The final drive element moves along a path represented by the line 40, which is spaced by the distance c from the axis 14. c is greater than b, which is greater than a. The difference between b and c exceeds the difference between a and b.

The spacing between the drive elements 17a and 17b, designated d in FIG. 4, is equal to the spacing between the drive elements 17b and 17c, designated e in FIG. 4. The spacing between drive elements 17c and 17d, designated f, exceeds the spacing e. The spacing g, of the drive elements 17d and 17e exceeds the spacing f. As represented in FIG. 4, the spacings d to g are measured in the direction of movement of the slide and are conveniently measured between planes perpendicular to the direction of movement of the slide and which contain respective axes of the elements 17a to 17e. The pitch of the elements 17 varies along the row.

The position of the teeth 16 relative to the axis 14 is selected according to the spacing of the corresponding elements 17 from the longitudinal centreline 41 of the housing, which is intersected by the axis 14. The teeth 16a and 16b which co-operate with the drive elements 17a, 17b and 17c do not extend from the axis 14 as far as the other teeth 16. The tooth 16 which is furthest from the teeth 16a and 16b extends furthest from the axis. The teeth 16 are arranged to enter the gaps between adjacent ones of the elements 17 and to exert force on successive ones of those elements as the slide is moved along the housing by turning of the control member 13. The position at which force is transmitted between the control member and the slide varies during the stroke of the slide and lies further from the axis 14 at one end of that stroke than is the case when the slide is at the opposite end of its stroke.

The arrangement illustrated in FIG. 4 provides a constant transmission ratio between the slide 12 and the control member 13 over that part of the stroke of the slide during which force is applied to and applied by the elements 17a, 17b and 17c. The transmission ratio varies as the element 17d moves into force-transmitting relation with a corresponding one of the teeth 16 and varies still further as the element 17e moves into force-transmitting relation with a further one of the teeth 16. When the spring 27 is being compressed by movement of the arm 15 during opening of the controlled door, the rate of linear displacement of the slide with respect to angular movement of the arm varies during that movement. As the spring is compressed further, the linear displacement of the slide which results from each unit of rotation of the control member 13 becomes less. The relative positions of the elements 17 may be varied from that illustrated in FIG. 4 to provide variation of the transmission ratio in some other manner.

Figure 3:
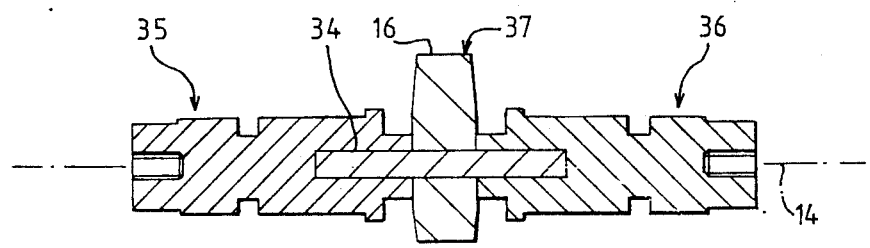
FIG. 3 shows a cross-section of a control member of the the device.

As shown in FIG. 3, each of the end portions 35 and 36 of the control member 13 has a larger diameter portion for co-operation with the bearings which support the control member in the housing 10 and a smaller diameter portion adjacent to the central piece 37. There is thus provided in the control member immediately adjacent to opposite faces of the central piece 37 a pair of annular channels in which there are received portions of the carrier 18 bordering the windows therein. As shown in FIG. 4, the roots of the teeth 16a and 16b are required to lie nearer to the pivot axis 14 than the larger diameter of the end pieces 35 and 36. Formation of the teeth 16 is facilitated by construction of the control member from separately formed pieces 35, 36 and 37. The teeth 16 are formed prior to assembly of the central piece 37 with the end pieces 35 and 36 so that the latter do not impede access to the roots of the teeth for machining.

The drive elements 17a, 17b and 17c are received between the larger diameter parts of the end pieces 35 and 36 as these drive elements move in turn, into mesh with the teeth 16. The drive elements 17 are free to turn about their own axes in the carrier 18. As the teeth 16 move into and out of mesh with the drive elements 17, the latter roll on the teeth 16. This minimises wear of both the teeth and the drive elements 17. The fit of the drive elements 17 between the teeth 16 is preferably such that, at all positions of the slide 12, turning of the control member 13 in either direction about the axis 14 is necessarily accompanied by longitudinal movement of the slide and that the slide cannot undergo significant longitudinal movement without turning of the control member 13. The angular position of the arm 15 is therefore controlled throughout its movement.

It will be noted that the carrier 18 is a unitary component and that the slide 12 comprises only the carrier, the member 20 and 28 on the ends of the carrier, the drive elements 17 and the retaining means for the drive elements. Grinding of the external surfaces of the members 20 and 28 is the only machining of the slide which is required, during manufacture.

The slide hereinbefore described may be modified by substitution of the individual drive elements 17 by a unitary rack having a row of teeth for cooperation with the teeth 16. Alternatively, the teeth of the slide may be formed on the carrier 18, rather than on a separate component or separate components.

The device hereinbefore described may also be modified by interposing an adjustable seat for the spring 27 between the spring and that end plug which is fitted in the housing at the end thereof opposite to the plug 11. The seat may have a threaded stem which co-operates with a screw thread in a bore formed in the adjacent end plug, an end portion of the stem being accessible from the outside of the housing, in order that torque can be applied to the stem to adjust the position of the seat along the housing and thereby vary the degree of compression of the spring.

What we claim is:

1. A door control device comprising a housing and a slide which is slidable along a path in the housing and a control member mounted for turning relative to the housing about an axis which is transverse to said path, wherein the slide has a row of drive elements which are spaced apart along said path, the control member has a number of drive elements arranged around said axis for co-operation with respective ones of the drive elements of the slide to transmit drive between the control member and the slide and wherein the slide includes a carrier for the drive elements of the slide, the device being characterised in that the drive element of the slide are individually mounted in the carrier.

2. A door control device comprising a hollow housing, a slide disposed in the housing for sliding along a path defined inside the housing, a control member mounted in the housing for turning relative thereto about a pivot axis transverse to said path and storing means disposed in the housing for storing energy when the slide is moved in one direction along its path relative to the housing, wherein the slide has a row of roller elements arranged with the length of the row extending generally along said path and the control member has a number of drive elements arranged around said pivot axis for co-operation with respective roller elements of the slide to transmit drive between the slide and the control member, wherein at least one of said drive elements of the control member extends from the pivot axis a distance which differs from the distance which another of said drive elements of the control member extends from the pivot axis, wherein the slide includes a carrier which is common to the elements of the slide and wherein the roller elements of the slide are individually and rotatably mounted in the carrier.

3. A device according to claim 2 wherein the slide further comprises a retainer for retaining the drive elements of the slide in the carrier.

4. A device according to claim 2 wherein the carrier has the form of a channel, the drive elements of the control member penetrate into the channel as the control member turns about the pivot axis and the drive elements of the control member move into engagement with the drive elements of the slide.

5. A door control device according to claim 2 wherein the slide further includes a valve assembly and the valve assembly is connected with all of the roller elements of the slide by said carrier.

* * * * *

UNITED STATES PATENT AND TRADEMARK OFFICE
CERTIFICATE OF CORRECTION

PATENT NO. : 4,937,914

DATED : July 3, 1990

INVENTOR(S) : Stephen J. Harrison and Peter E. Brown

It is certified that error appears in the above-identified patent and that said Letters Patent is hereby corrected as shown below:

Column 2 Line 16 "driver" should read --drive-- (first occurrence).

Column 3 Line 51 after "pressing" insert --of--.

Column 4 Line 49 "member" should read --members--.

Claim 1 Line 16 Column 8 after "individually" insert --and rotatably--.

Claim 3 Line 39 Column 8 delete "drive" and insert --roller-- it its place.

Claim 4 Line 46 Column 8 delete "drive" and insert --roller-- in its place.

Signed and Sealed this

Fourteenth Day of January, 1992

Attest:

HARRY F. MANBECK, JR.

*Attesting Officer*  *Commissioner of Patents and Trademarks*